United States Patent
Tong et al.

(10) Patent No.: US 8,776,521 B2
(45) Date of Patent: Jul. 15, 2014

(54) SYSTEMS AND METHODS FOR PREWARMING HEAT RECOVERY STEAM GENERATOR PIPING

(75) Inventors: Leslie Yung-Min Tong, Atlanta, GA (US); Diego Rancruel, Greenville, SC (US); SriHarsha Vedavyasachar, Hyderabad (IN)

(73) Assignee: General Electric Company, Schenectady, NY (US)

( * ) Notice: Subject to any disclaimer, the term of this patent is extended or adjusted under 35 U.S.C. 154(b) by 1063 days.

(21) Appl. No.: 12/713,213

(22) Filed: Feb. 26, 2010

(65) Prior Publication Data

US 2011/0209479 A1 Sep. 1, 2011

(51) Int. Cl.
*F01K 7/34* (2006.01)
*F01K 9/00* (2006.01)

(52) U.S. Cl.
USPC ............ 60/653; 60/661; 60/662; 60/663; 60/679

(58) Field of Classification Search
USPC ............ 60/653, 667–679, 662, 663, 661
See application file for complete search history.

(56) References Cited

U.S. PATENT DOCUMENTS

| | | | | |
|---|---|---|---|---|
| 2,900,792 A | * | 8/1959 | Buri | 60/656 |
| 4,007,595 A | * | 2/1977 | Braytenbah et al. | 376/211 |
| 4,353,216 A | * | 10/1982 | Dickenson | 60/662 |
| 4,357,803 A | * | 11/1982 | Dickenson | 60/662 |
| 4,598,551 A | * | 7/1986 | Dimitroff et al. | 60/646 |
| 5,181,381 A | * | 1/1993 | Gounder | 60/648 |
| 6,405,537 B1 | * | 6/2002 | Wada et al. | 60/778 |
| 2004/0013511 A1 | | 1/2004 | Brackenhammer et al. | |
| 2008/0236616 A1 | * | 10/2008 | Bloch | 134/2 |
| 2009/0158738 A1 | | 6/2009 | Hu et al. | |
| 2010/0242430 A1 | * | 9/2010 | Hu et al. | 60/39.182 |

FOREIGN PATENT DOCUMENTS

| | | |
|---|---|---|
| CN | 1061643 A | 6/1992 |
| EP | 1031788 A2 | 8/2000 |
| KR | 100567907 B1 | 3/2006 |

OTHER PUBLICATIONS

CN Review Notice for First Examination dated Nov. 15, 2013, issued in connection with corresponding Application No. 201110051934.4.

* cited by examiner

*Primary Examiner* — Hoang Nguyen
(74) *Attorney, Agent, or Firm* — Sutherland Asbill & Brennan LLP

(57) ABSTRACT

The present application describes a heat recovery steam generator. The heat recovery steam generator may include a superheater, a first turbine section, a first main steam line in communication with the superheater and the first turbine section, and a first prewarming line positioned downstream of the first main steam line such that a flow of steam from the superheater preheats the first main steam line without entry into the first turbine section.

20 Claims, 2 Drawing Sheets

SYSTEMS AND METHODS FOR PREWARMING HEAT RECOVERY STEAM GENERATOR PIPING

TECHNICAL FIELD

The present application relates generally to a combined cycle power plant and more particularly relates to systems and methods for prewarming heat recovery steam generator piping so as to provide stress mitigation as well as improvements in overall power plant start up time.

BACKGROUND OF THE INVENTION

Generally described, a combined cycle power plant uses a combination of a gas turbine and a steam turbine to produce electrical power. Specifically, a gas turbine cycle may be operatively combined with a steam turbine cycle by way of a heat recovery steam generator ("HRSG") and the like.

Because the steam turbine cycle is driven from the exhaust of the gas turbine, the HRSG may not become fully operational until the gas turbine cycle has increased the steam turbine cycle to a suitable temperature. For example, the temperature of the exhaust gas gradually increases at startup as the firing temperature of the gas turbine increases. Although the hot exhaust gases from the gas turbine flow through the HRSG, a considerable period of time may elapse before an initially cold HRSG is capable of generating steam at a sufficient pressure and temperature. In conventional systems, the gas turbine thus may be kept at relatively low loads until the temperature of the HRSG increases to a level where the HRSG can generate steam at a desired pressure and temperature.

The superheated steam generated in the HRSG may be located several hundred feet away from the steam turbine or more. The piping connecting the HRSG and the steam turbine thus may be several hundred degrees cooler than the superheated steam being generated. Flowing superheated steam through pipes with cooler metal temperatures with respect to the steam, however, may cause a temperature reduction of the steam upon admission into the steam turbine. This drop in temperature may lead to a loss of equipment life or delays in allowing steam admission to the turbine due to inadequate time for the pipes to warm up. Similarly, if steam admission is delayed to allow the pipes to warm up gradually, increased operational costs may be incurred as the generated steam is bypassed to the condenser or otherwise as opposed to being used to generate work. There is thus a desire for an improved heat recovery steam generator system and associated piping startup and warming procedures. Preferably, such improved systems and procedures should mitigate the stress within the piping while also providing improved start up times.

SUMMARY OF THE INVENTION

The present application thus describes a heat recovery steam generator. The heat recovery steam generator may include a superheater, a first turbine section, a first main steam line in communication with the superheater and the first turbine section, and a first prewarming line positioned downstream of the first main steam line such that a flow of steam from the superheater preheats the first main steam line without entry into the first turbine section.

The present application further provides for a method of starting up a heat recovery steam generator. The method may include the steps of generating a flow of steam in a superheater, directing the flow of steam through a first main steam line, diverting the flow of steam through a first prewarming line until the flow of steam reaches a predetermined temperature, and directing the flow of steam to a first turbine section once the predetermined temperature is reached.

The present application further provides for a heat recovery steam generator. The heat recovery steam generator may include a superheater, a first turbine section, a first main steam line in communication with the superheater and the first turbine section, a first prewarming line positioned downstream of the first main steam line such that a flow of steam from the superheater preheats the first main steam line without entry into the first turbine section, a second turbine section, a reheater downstream of the first turbine section, a second main steam line in communication with the reheater and the second turbine section, and a second prewarming line positioned downstream of the second main steam line such that the flow of steam from the reheater preheats the second main steam line without entry into the second turbine section.

These and other features and improvements of the present application will become apparent to one of ordinary skill in the art upon review of the following detailed description when taken in conjunction with the several drawings and the appended claims.

DETAILED DESCRIPTION

Figure 1:
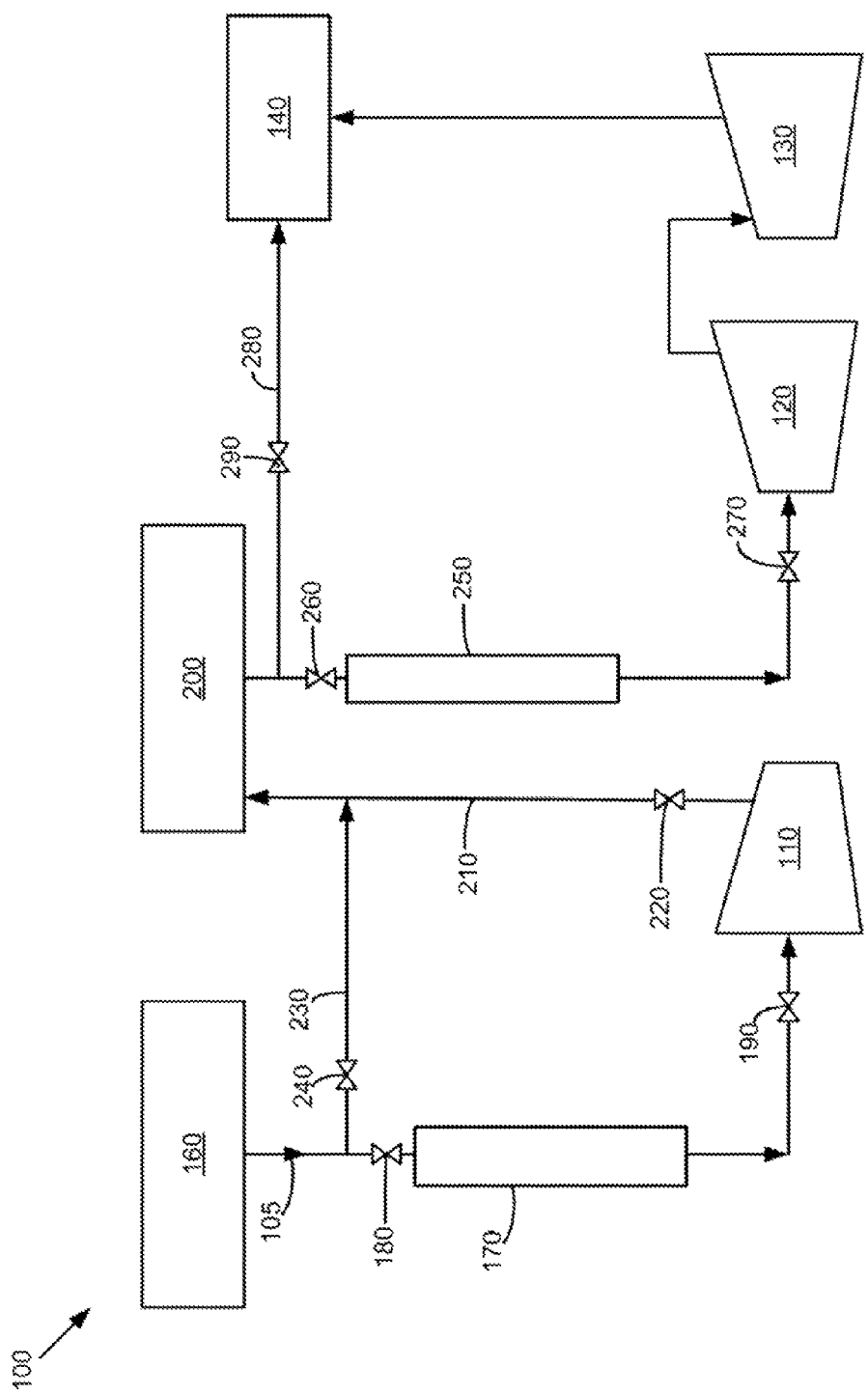
FIG. 1 is a schematic view of a known heat recovery steam generator system.

Referring now to the drawings, in which like numerals refer to like elements throughout the several views, FIG. 1 shows a conventional heat recovery steam generator ("HRSG") system 100. A flow of steam 105 may be cycled through a series of turbine stages, including a high pressure stage 110, an intermediate pressure stage 120, and a low pressure stage 130. A condenser 140 may be connected to the low pressure stage 130 and indirectly to the high pressure stage 120 via a bypass line or otherwise. The condenser 140 collects steam, water, or mixtures thereof used in the various stages 110, 120, 130.

A flow of the superheated steam 105 may be provided by a high pressure superheater 160. The high pressure superheater 160 may be heated by exhaust from the gas turbine or otherwise. The high pressure superheater 160 directs the superheated steam flow 105 to the high pressure stage 120 via a high pressure stage main steam line 170. A high pressure stage main steam line isolation valve 180 may be positioned between the high pressure superheater 160 and the high pressure stage main steam line 170 so as to control the steam flow therethrough. Likewise, a high pressure stage main steam line control valve 190 may be positioned between the high pressure stage main steam line 170 and the high pressure stage 110 so as to control the pressure and steam flow therethrough.

After the flow of steam 105 drives the high pressure stage 110, the flow of steam 105 may be directed towards a reheater 200 via a cold reheat line 210. A cold reheat line valve 220 may be positioned thereon. A high pressure stage cascade bypass line 230 also may be positioned downstream of the high pressure superheater 160 and in communication with the cold reheat line 210. A high pressure stage cascade bypass line valve 240 may be positioned thereon.

The output of the cold reheat line 210 and/or the high pressure stage cascade bypass line 230 then may be heated in the reheater 200. The reheater 200 also may be heated by exhaust from the gas turbine or otherwise. The flow of steam 105 from the reheater 200 may be directed towards the intermediate pressure stage 120 via an intermediate pressure stage main steam line 250. The flow between the reheater 200 and the intermediate pressure stage main steam line 250 may be controlled by a hot reheat isolation valve 260. Likewise, the flow and pressure between the intermediate pressure stage main steam line 250 and the intermediate pressure stage 120 may be controlled by an intermediate pressure stage main steam line control valve 270. A hot reheat bypass line 280 also may be positioned downstream of the reheater 200 and in communication with the condenser 140. A hot reheat bypass line valve 290 may be positioned thereon. Although only one of each of the above-referenced components is shown, any number of similar components may be used in the overall HRSG system 100.

Because the steam turbine cycle derives mechanical energy from the flow of steam 105, the steam turbine cycle components and the associated steam lines may operate at extremely high temperatures. These components and the steam lines, however, may fall outside of a desired operating range. For example, the HRSG system 100 may be in a "cold" thermal state condition after an extended period of time of non-operation. If the HRSG system 100 is simply turned on when cold, the sudden thermal expansion may cause physical stress on the components and steam lines which may lead to a reduced useful lifetime and/or damage.

Figure 2:
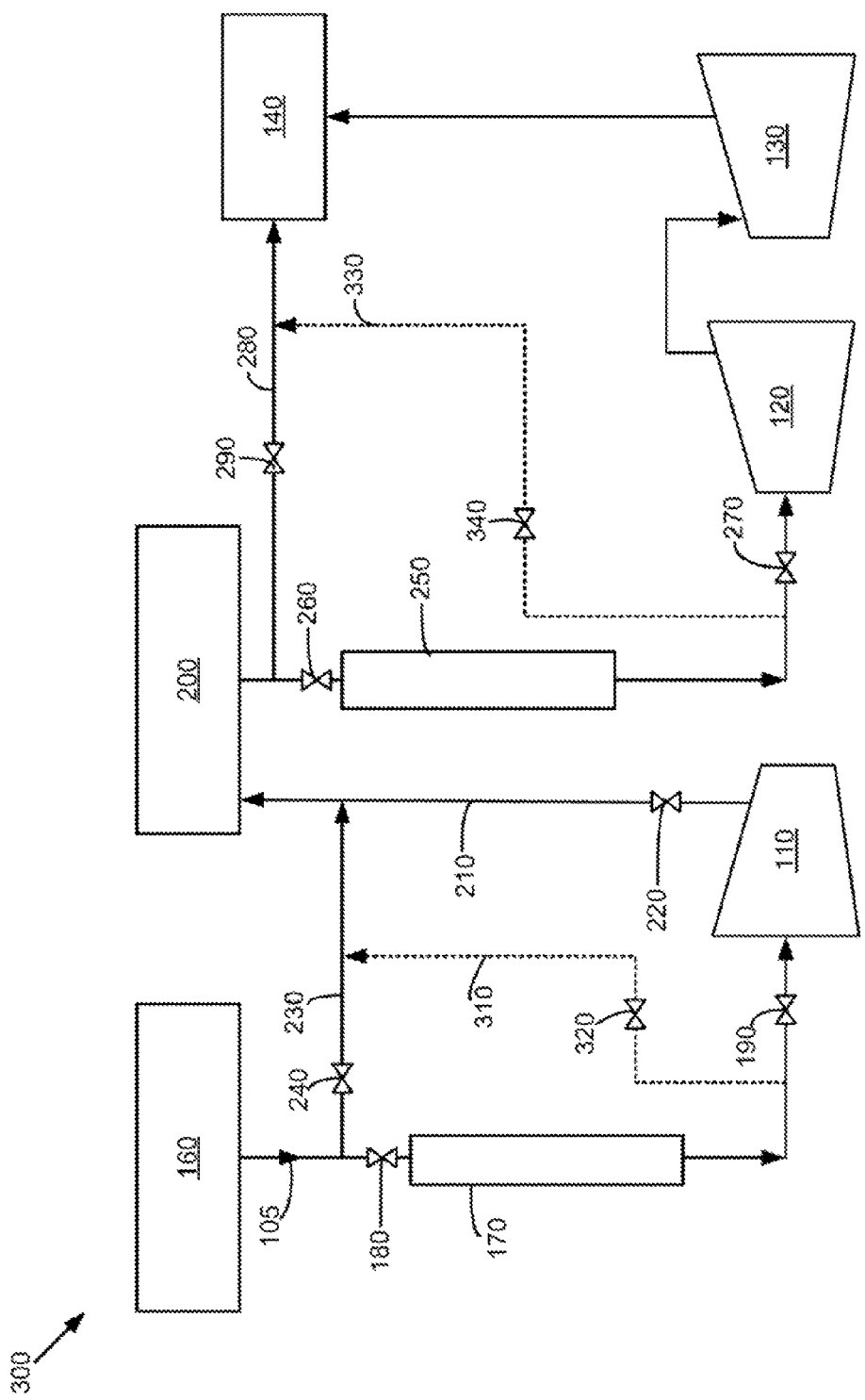
FIG. 2 is a schematic view of a heat recovery steam generator system as may be described herein.

FIG. 2 shows a heat recovery steam generator ("HRSG") system 300 as may be described herein. The HRSG system 300 may be largely identical to the HRSG system 100. The HRSG system 300 also may includes a high pressure stage prewarming line 310. The high pressure stage prewarming line 310 may be positioned downstream of the high pressure stage main steam line 170 and just upstream of the high pressure stage main steam line control valve 190. The high pressure stage prewarming line 310 may extend to the high pressure stage cascade bypass line 230. A high pressure stage prewarming valve 320 also may be positioned thereon. The high pressure stage prewarming line 310 may be positioned as close as possible to the high pressure stage main steam line control valve 190 so as to ensure that as much of the high pressure stage main steam line 170 may be warmed as possible.

Likewise, an intermediate pressure stage prewarming line 330 may extend from just upstream of the intermediate pressure stage main steam line control valve 270 to the hot reheat bypass line 280 about the condenser 140. An intermediate pressure stage prewarming line valve 340 may be positioned thereon.

In use, the flow of steam 105 from the high pressure superheater 160 and the reheater 200 may be used to warm the high pressure stage main steam line 170 and the intermediate pressure stage main steam line 250 as opposed to being dumped directly or indirectly to the condenser 140 via the bypass lines 145, 280 or otherwise without performing useful work. Specifically, the high pressure stage main steam line isolation valve 180 and the high pressure stage prewarming line valve 320 may be opened while the high pressure stage main steam line control valve 190 and the high pressure stage cascade bypass valve 240 may be shut so as to warm the high pressure stage main steam line 170.

Likewise, the hot reheat isolation valve 260 and the intermediate pressure stage prewarming line valve 340 may be opened while the intermediate pressure stage main steam line control valve 270 and the hot reheat bypass valve 290 may be shut so as to warm the intermediate pressure stage main steam line 250. This preheating thus warms the main steam lines 170, 250 and, once the preheating sequence is complete, ensures that the flow of steam 105 entering the stages 110, 120 is at approximately at the proper temperature. Once the flow of steam 105 maintains such a temperature for an appropriate amount of time, the preheating sequence may cease and steam 105 may flow through the stages and otherwise in a normal manner.

In the case of the use of multiple superheaters or outlets, the high pressure stage prewarming line valve 320 and the high pressure stage main steam line isolation valve 180 may be allowed to open once the high pressure stage cascade bypass valve 240 reaches a predetermined stroke so as to ensure that steam is available for prewarming purposes. The remaining prewarming line valves 340 and the isolation valves 260 may open once the outlet pressure of the high pressure superheater 160 is higher than the pressure within the high pressure stage main steam line 170 so as to ensure a positive flow. This provides operational flexibility for the prewarming so as to account for the gas turbine operating at different loads.

The HRSG system 300 as is described herein thus heats the main steam lines 170, 250 with no additional energy costs. This flow 105 also may be used with respect to the reheater 200 and otherwise. The prewarming concept also may be applied to the low pressure section 130 and otherwise.

It should be apparent that the foregoing relates only to certain embodiments of the present application and that numerous changes and modifications' may be made herein by one of ordinary skill in the art without departing from the general spirit and scope of the invention as defined by the following claims and the equivalents thereof.

We claim:

1. A heat recovery steam generator system, comprising:
a superheater;
a first turbine section;
a first main steam line in communication with the superheater and the first turbine section;
a first bypass line positioned upstream of the first main steam line;
a reheater positioned downstream of the first turbine section; and
a first prewarming line positioned downstream of the first main steam line and configured such that a flow of steam from the superheater preheats the first main steam line without entry into the first turbine section and is directed to the reheater so as to produce a reheated flow of steam, wherein the heat recovery steam generator system is configured to reuse the reheated flow of steam therein.

2. The heat recovery steam generator of claim 1, wherein the first turbine section comprises a high pressure section and wherein the first main steam line comprises a high pressure section main steam line.

3. The heat recovery steam generator of claim 1, wherein the first prewarming line extends to the first bypass line.

4. The heat recovery steam generator of claim 1, wherein the first bypass line extends to a cold reheat line, and wherein the first prewarming line extends to the first bypass line upstream of the cold reheat line.

5. The heat recovery steam generator of claim 1, further comprising a first bypass line valve positioned on the first bypass line.

6. The heat recovery steam generator of claim 1, further comprising an isolation valve positioned upstream of the first main steam line, and a control valve positioned downstream of the first main steam line.

7. The heat recovery steam generator of claim 1, further comprising a second main steam line, and a second turbine section positioned downstream of the first turbine section, wherein the second main steam line is in communication with the reheater and the second turbine section.

8. The heat recovery steam generator of claim 7, further comprising a second bypass line positioned upstream of the second main steam line, a condenser positioned downstream of the second turbine section, and a second prewarming line positioned downstream of the second main steam line and configured such that the reheated flow of steam from the reheater preheats the second main steam line without entry into the second turbine section and is directed to the condenser.

9. The heat recovery steam generator of claim 8, wherein the second turbine section comprises an intermediate pressure section and wherein the second main steam line comprises an intermediate pressure section main steam line.

10. The heat recovery steam generator of claim 8, wherein the second prewarming line extends to the second bypass line.

11. A method of starting up a heat recovery steam generator, comprising:
generating a flow of steam in a superheater;
directing the flow of steam through a first main steam line;
diverting the flow of steam through a first prewarming line and to a first bypass line until the flow of steam reaches a predetermined temperature; and
directing the flow of steam to a first turbine section once the predetermined temperature is reached.

12. The method of claim 11, further comprising:
reheating the flow of steam in a reheater so as to produce a reheated flow of steam;
directing the reheated flow of steam through a second main steam line;
diverting the reheated flow of steam through a second prewarming line and to a second bypass line until the reheated flow of steam reaches the predetermined temperature; and
directing the reheated flow of steam to a second turbine section once the predetermined temperature is reached.

13. The method of claim 12, further comprising directing the reheated flow of steam to a condenser.

14. The method of claim 11, wherein the step of diverting the flow of steam through a first prewarming line comprises opening a first main steam line isolation valve and a first prewarming line valve and closing a first main steam line control valve.

15. The method of claim 12, wherein the step of diverting the reheated flow of steam through a second prewarming line comprises opening a reheat isolation valve and a second prewarming line valve and closing a second main steam line control valve.

16. A heat recovery steam generator system, comprising:
a superheater;
a first turbine section;
a first main steam line in communication with the superheater and the first turbine section;
a first bypass line positioned upstream of the first main steam line;
a reheater positioned downstream of the first turbine section;
a first prewarming line positioned downstream of the first main steam line and configured such that a flow of steam from the superheater preheats the first main steam line without entry into the first turbine section and is directed to the reheater so as to produce a reheated flow of steam;
a second turbine section;
a second main steam line in communication with the reheater and the second turbine section;
a second bypass line positioned upstream of the second main steam line;
a condenser positioned downstream of the second turbine section; and
a second prewarming line positioned downstream of the second main steam line and configured such that the reheated flow of steam from the reheater preheats the second main steam line without entry into the second turbine section and is directed to the condenser.

17. The heat recovery steam generator of claim 16, wherein the first turbine section comprises a high pressure section, the first main steam line comprises a high pressure section main steam line, the second turbine section comprises an intermediate pressure section, and the second main steam line comprises an intermediate pressure section main steam line.

18. The heat recovery steam generator of claim 16, wherein the first bypass line extends to a cold reheat line, and wherein the first prewarming line extends to the first bypass line upstream of the cold reheat line.

19. The heat recovery steam generator of claim 16, further comprising a first bypass line valve positioned on the first bypass line.

20. The heat recovery steam generator of claim 16, further comprising an isolation valve positioned upstream of the first main steam line, and a control valve positioned downstream of the first main steam line.

* * * * *